Figure 1:
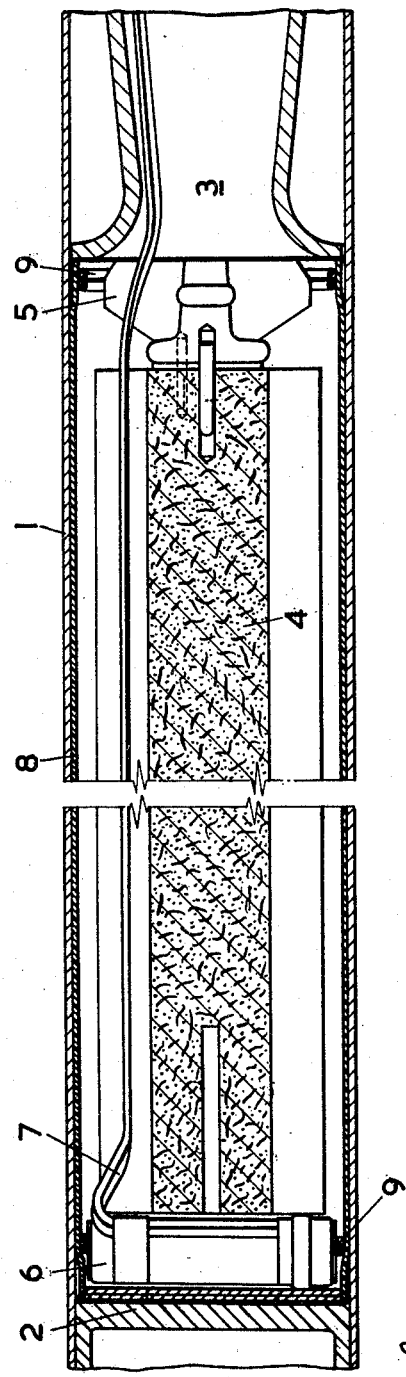

Dec. 25, 1962  J. W. MARTIN ETAL  3,069,845
LINER FOR COOLING ROCKET MOTORS
Filed March 16, 1959  2 Sheets-Sheet 1

Inventors,
John W. Martin
Arthur G. Walters

By S. J. Rotondi & A. D. Dupont
Attorneys

Inventors,
John W. Martin
Arthur G. Walters
By S. J. Rotondi & A. J. Dupont
Attorneys.

3,069,845
LINER FOR COOLING ROCKET MOTORS
John William Martin, Wilmington, and Arthur Gwynfryn Walters, Bexley, England, assignors to Minister of Supply, in Her Majesty's Government of the United Kingdom of Great Britain and Northern Ireland, London, England
Filed Mar. 16, 1959, Ser. No. 799,588
Claims priority, application Great Britain Mar. 14, 1958
1 Claim. (Cl. 60—35.6)

This invention relates to rocket motors.

Some causes of inaccuracy and dispersion in rocket projectiles and of velocity fluctuations in rocket propelled vehicles may be traced to thermal effects in the rocket motors. One such effect common to most types of rocket projectile is the unsymmetrical expansion of the rocket tube due to asymmetric heating by the burning propellant. This effect leads to distortion and, in particular, to bending of the tube and produces inaccuracy similar to that which would be caused by misalignment of the venturi. In fin stabilised rocket projectiles such an effect is particularly marked if it occurs in the early stages of burning since, at the low velocity then obtaining, the stabilising effect of the fins is small. In the later stages of burning when the velocity is higher and the stabilising effect of the fins is greater the effect is less important.

A second effect occurs in thrust cut off rockets, that is to say rockets whose final velocity is controlled by releasing the throat constriction at some stage of the burning whereby burning is terminated owing to the rapid reduction of pressure. If the rocket wall is sufficiently hot, radiation from the wall may restart the burning after cut off and may result in intermittent burning or chuffing which will introduce fluctuations in velocity.

A third effect may occur when a rocket contains more than one burning chamber the propellant charges in which chambers are arranged to be ignited at different times. A charge intended to have a delayed ignition may be prematurely ignited by heat transmitted through dividing walls from a previously ignited charge.

It is obviously desirable to provide satisfactory thermal insulation between the propellant charge and the wall of the combustion chamber particularly in the early stages of burning. Certain types of thermal insulating liners have been used which were made of refractory materials such as sodium silicate and alumina. A thin layer of the material was used to give the moderate degree of insulation necessary to prevent heat bursts. The thickness of such material required to give the degree of insulation necessary to reduce the above thermal effects to an acceptable level would be considerable and would introduce fabrication difficulties and liability to fracture under thermal shock. Performance of the rocket motor would be degraded since heat lost to the refractory material would not be available for conversion to kinetic energy in the exhaust jet. It is therefore necessary to provide improved insulants if inaccuracy due to thermal effects is to be appreciably reduced.

In accordance with the invention there is provided a rocket motor wherein the combustion chamber is wholly or partly lined with a material which has a highly endothermic reaction with the propellant gases A considerable number of materials, for example, various rubbers, with or without fillers, and neoprenes; certain plastics, particularly polymers such as polyvinyl chloride, polyurethane, polytetrafluoroethylene and polyethylene; and some asbestos compositions provide a good degree of insulation. The time for which the insulation is operative depends on the thickness of the insulant and is generally terminated by the removal of the layer due to melting and erosion. Of the materials easily available at the present time, polyethylene appears to be particularly effective and can be easily adapted to line motors of any shape.

In a preferred form, therefore, the invention comprises a rocket motor wherein the combustion chamber is wholly or partly lined with polyethylene.

The lining material may be applied in any suitable manner, for example, it may be moulded in situ, moulded to shape before insertion or fitted in tubular or sheet form into the motor. Any joints in the material must be sufficiently accurately made to prevent the hot gases from penetrating to the motor walls and the material must fit sufficiently tightly against the walls to prevent penetration of the gases between walls and liner. If necessary the sheet or tubular material may be retained in position with spring clips or other suitable devices though if the fit is good enough these may not be required. Joints may if necessary be finished with a sealing compound but it has been found that with a well fitted joint gas peneration will probably not occur and with some materials, notably polyethylene and polyvinyl chloride the joints become welded by the heat generated by the burning propellant.

Figure 2:
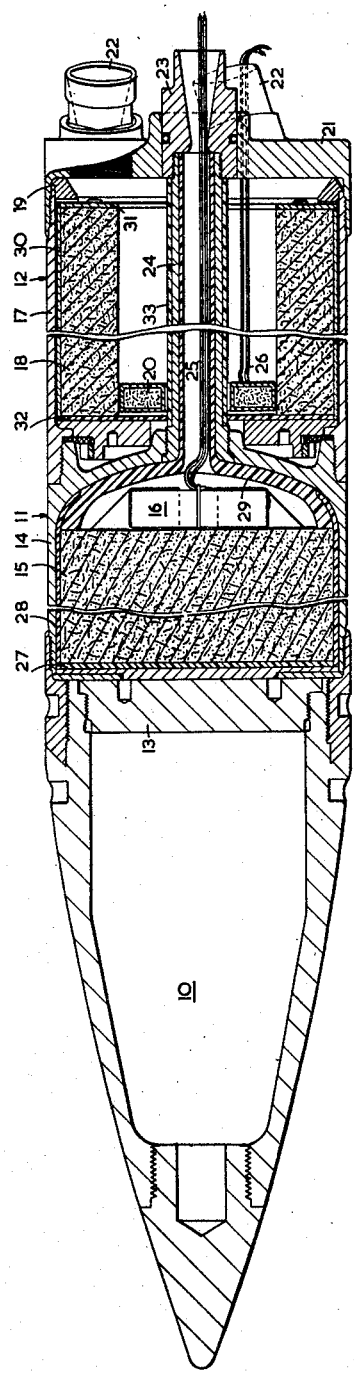

The invention will now be more particularly described, by way of example only, with reference to the accompanying drawings in which:

FIG. 1 is a broken longitudinal section of a rocket motor having a single combustion chamber; and FIG. 2 is a broken longitudinal section of a rocket carrying boost and sustainer charges in separate combustion chambers.

The motor shown in FIG. 1 has a tubular body 1 closed at its forward end by a bulkhead 2 and carrying a venturi 3 at its rearward end. Within the body 1 is a cruciform propellant charge 4, supported by a grid 5; and an igniter 6 the leads 7 from which are carried rearward and out through the venturi 3. The body 1 extends for the full length of the motor and its intermediate portion, which forms the tubular wall of the combustion chamber is lined with a thin layer 8 of polyethene or one of the other insulants hereinbefore described. The layer may be inserted in the form of a tube or may be a sheet of material inserted so that a well fitting butt joint runs longitudinally of the motor. If desired the layer 8 may be retained in position by means of spring clips 9.

A comparatively thin layer has been found sufficient to produce a large reduction in heat transfer to the motor wall in the critical early stages of burning. For example, a layer of polyethylene .05" thick gave very good insulation for 0.8 second in a 3" rocket having a total burning time of 1.5 seconds and resulted in a considerable improvement in accuracy. In a thrust cut off rocket a similar layer has been shown to be effective in reducing the likelihood of reignition. In a particular example the time up to which clean cut off could be obtained was extended from 0.1 second in an unlined motor to 0.8 second when the motor was lined with a layer of polyethylene .07" thick.

The rocket shown in FIG. 2 comprises a nose assembly 10, a sustainer motor 11 and a boost motor 12. The sustainer motor 11, which is separated from the nose assembly 10 by a bulkhead 13, has a tubular casing 14, closed at its rear end except for an axial orifice; and carries a solid cylindrical sustainer charge 15 and an igniter 16. The boost motor 12 has a tubular casing 17, attached to the rear end of the casing 14 of the sustainer motor, and carries a star centre boost charge 18, supported on a ring 19, and an igniter 20. The rear end of the boost motor 12 carries a baseplate 21 wherein are fixed a group of canted nozzles 22 through which are discharged the gases from the boost charge 18; and an axial nozzle 23, connected by a tube 24 to the axial orifice in the rear end of the sustainer motor casing 14, through which nozzle are discharged the gases from the sustainer charge 15. Leads 25, 26 from the igniters 16, 20 are carried rearwardly and out through appropriate nozzles.

The sustainer charge 15 may, if desired, be of plastic propellant and the motor 11 is lined with a layer of polyethylene or other insulant comprising a disc 27 at the forward end of the charge, a tube or sheet 28 covering the inner cylindrical surface of the casing 14 and a shaped member 29 covering the inner surface of the rear end of the motor and extending rearwardly to cover the inner surface of the tube 24. The disc 27 and the tube or sheet 28 reduce heat transfer to the bulkhead 13 and the casing 14 and also act as inhibitors to restrict burning to the rear end surface of the charge 15 so that end or "cigarette" type burning is maintained. The shaped member 29 reduces heat transfer from the hot gases to the rear wall of the sustainer motor and to the tube 24 which, if heated excessively, may deform or even burst under pressure applied by the hot gases.

The boost motor 12 is partly lined wtih polyethylene or other insulant. Since burning is restricted to the internal surface of the charge 18 and the burning time is normally very short it is usually not necessary to insulate the motor casing 17 and the outer surface and rear end of the charge are merely coated with an inhibitor 30, 31 to prevent burning on those surfaces. A disc 32 of insulant is inserted into the forward end of the motor to reduce heat transfer to the dividing wall between the motors 11 and 12. In cases where the sustainer charge 15 is to be ignited at a later stage than the boost charge 18 heat transfer through the said dividing wall might cause preignition of the sustainer charge. The insulant disc 32 and the shaped member 29 provide a safeguard against such preignition. A tube or sheet 33 of polyethylene or other insulant surrounds the outer surface of the tube 24 to reduce the heat transfer to that tube from the hot gases evolved from the boost charge 18.

A further advantage may be obtained by the use of polyethylene liners in certain low thrust, slow discharge rate rockets such, for example, as the sustainer motor 11 shown in FIG. 2, in which end or cigarette type burning is required. Extruded cordite is liable to contain flaws into which burning may penetrate to produce pressure pockets which will cause the charge to break up and burning to become irregular. Plastic propellant does not have this disadvantage but, since its coefficient of expansion is very different from that of the metal walls of the motor, temperature changes occurring during storage cause relative movement between the layer of propellant adhering to the motor wall and the remainder of the charge which movement is not fully recoverable when a temperature change is reversed. As a result the end face of the charge assumes an undulating formation which leads to irregular burning and consequent inaccuracy. If the motor is lined with polyethylene, which has a coefficient of expansion similar to that of the plastic propellant, relative movement resulting from cycles of temperature will occur only between the polyethylene liner and the motor wall where relative sliding can take place and the irregularity will not occur. Polyethylene also retains good adhesion with plastic propellant a property which is essential in this type of rocket motor since otherwise burning will tend to penetrate between the propellant and the liner to produce side as well as end burning. Other lining materials hereinbefore mentioned are much less useful than polyethylene in this type of rocket since although their coefficients of expansion are generally similar to that of plastic propellant they will not normally adhere to the propellant and hence only satisfy one of the two conditions required.

Although the insertion of an insulating layer will generally involve either a reduction in propellant charge or an increase in weight of the rocket motor, the reduction in heat losses due to the insulation will normally be sufficient to avoid any loss in performance which would otherwise result. It has also been found that the use of an insulating layer tends to reduce nozzle erosion.

We claim:

A projectile comprising a cylindrical tubular body closed at its forward end, said forward end of the tubular body being connected to a nose assembly, a sustainer motor within said forward end, a consumable liner of polyethylene for cooling and covering the interior surface of the forward motor body, a sustainer propellant charge within said sustainer motor, an igniter within said sustainer motor for initiating said propellant, a discharge nozzle extending axially from the rear of the motor to the rear end of the projectile, a consumable liner of polyethylene for cooling and covering both the interior and exterior of said nozzle and to prevent reignition at cut-off, a booster motor having a propellant charge surrounding the extended section of the discharge nozzle and radially spaced therefrom, a consumable polyethylene liner on the interior surface of said booster motor, a second igniter located between the booster propellant and the axial nozzle for the booster motor, a base plate at the rear end of the projectile acting as a closure for the tubular body and the booster motor, said base plate having a center nozzle connected to said axial nozzle of the sustainer motor, nozzles and said base plate radially disposed around said center nozzle through which the booster gases are discharged and canted to impart spin to the projectile when launched, all of said liners while in flight being gradually consumed in an endothermic reaction absorbing a sufficient amount of heat from the combustion gases to substantially cool the lined surfaces while providing additional fuel to each motor.

References Cited in the file of this patent

UNITED STATES PATENTS

| | | |
|---|---|---|
| 958,990 | Bourdelles | May 24, 1910 |
| 2,563,265 | Parsons | Aug. 7, 1951 |
| 2,762,193 | Johnson | Sept. 11, 1956 |
| 2,835,107 | Ward | May 20, 1958 |
| 2,853,946 | Loedding | Sept. 30, 1958 |
| 2,858,289 | Bohn et al. | Oct. 28, 1958 |
| 2,877,504 | Fox | Mar. 17, 1959 |
| 2,939,275 | Loedding | June 7, 1960 |
| 2,942,547 | Rabern et al. | June 28, 1960 |
| 2,976,678 | Kennedy | Mar. 28, 1961 |
| 2,978,308 | Keller | Apr. 4, 1961 |
| 2,985,055 | McMichael | May 23, 1961 |
| 2,999,462 | Mosher et al. | Sept. 12, 1961 |
| 3,000,306 | Wenzel et al. | Sept. 19, 1961 |
| 3,017,746 | Kiphart | Jan. 23, 1962 |

FOREIGN PATENTS

| | | |
|---|---|---|
| 1,003,758 | France | Nov. 21, 1951 |
| 787,411 | Great Britain | Dec. 11, 1957 |

OTHER REFERENCES

Modern Plastic, vol. 34, October 1956, pages 148–150.